United States Patent [19]

Isabelle et al.

[11] Patent Number: 5,203,322

[45] Date of Patent: Apr. 20, 1993

[54] SUPPORT MECHANISM FOR TREATMENT DEVICE

[76] Inventors: Pierre Isabelle, 5360 Bégin St., St-Hubert, Quebec, Canada, J3Y 2P9; Marc A. Archambault, 8774 Rene-Labelle St., Montreal, Quebec, Canada, H2M 2L7; Mario Goulet, 40 Terrasse Barbeau, Lavaltrie, Quebec, Canada, J0K 1H0

[21] Appl. No.: 753,847

[22] Filed: Sep. 3, 1991

[51] Int. Cl.$^5$ .................... A61H 23/00; A61H 31/02
[52] U.S. Cl. ........................... 128/55; 128/30
[58] Field of Search ............... 128/44, 48–55, 128/28–30.2; 248/280.1, 123.1

[56] References Cited

U.S. PATENT DOCUMENTS

| | | | |
|---|---|---|---|
| 3,433,444 | 3/1969 | Smith | 248/280.1 X |
| 3,601,122 | 8/1971 | Guertin | 128/55 |
| 4,213,591 | 7/1980 | Jaakkola | 248/281.1 |
| 4,241,891 | 12/1980 | Rudolph | 248/123.1 |
| 4,548,373 | 10/1985 | Komura | 248/280.1 X |
| 4,867,405 | 9/1989 | Nakamura | 248/123.1 |
| 4,969,625 | 11/1990 | Singer et al. | 248/123.1 |
| 4,984,568 | 1/1991 | Persaud | 128/55 |
| 4,987,690 | 1/1991 | Aaldenbey et al. | 248/281.1 |

Primary Examiner—Robert A. Hafer
Assistant Examiner—Brian E. Hanlon

[57] ABSTRACT

An adjustable support mechanism for supporting a treatment device, and namely, a percussion generating tool having a treatment head and which is utilized by a patient to apply vibrations and percussion treatment to a predetermined area of his body. The support mechanism comprises an extendable boom which is pivotally secured at an attachment end to an adjustable pivoting housing which is securable to a stationary object. The pivoting housing permits vertical and horizontal angular displacement of the boom, and has an adjustable pressure biasing mechanism which acts on the boom to displace same vertically on a pivot connection to thereby apply a vertical moment on the load secured to the free end of the boom. An articulated connecting joint interconnects the treatment device to the free end of the boom. The connecting joint has a disconnectible brake to position the treatment device at a desired angle relative to the free end of the boom. A handle is provided to position the treatment head to the desired position. A lever is integrated with the handle to disconnect and reconnect the brake to adjust the angular position of the treatment device relative to the boom free end.

13 Claims, 2 Drawing Sheets

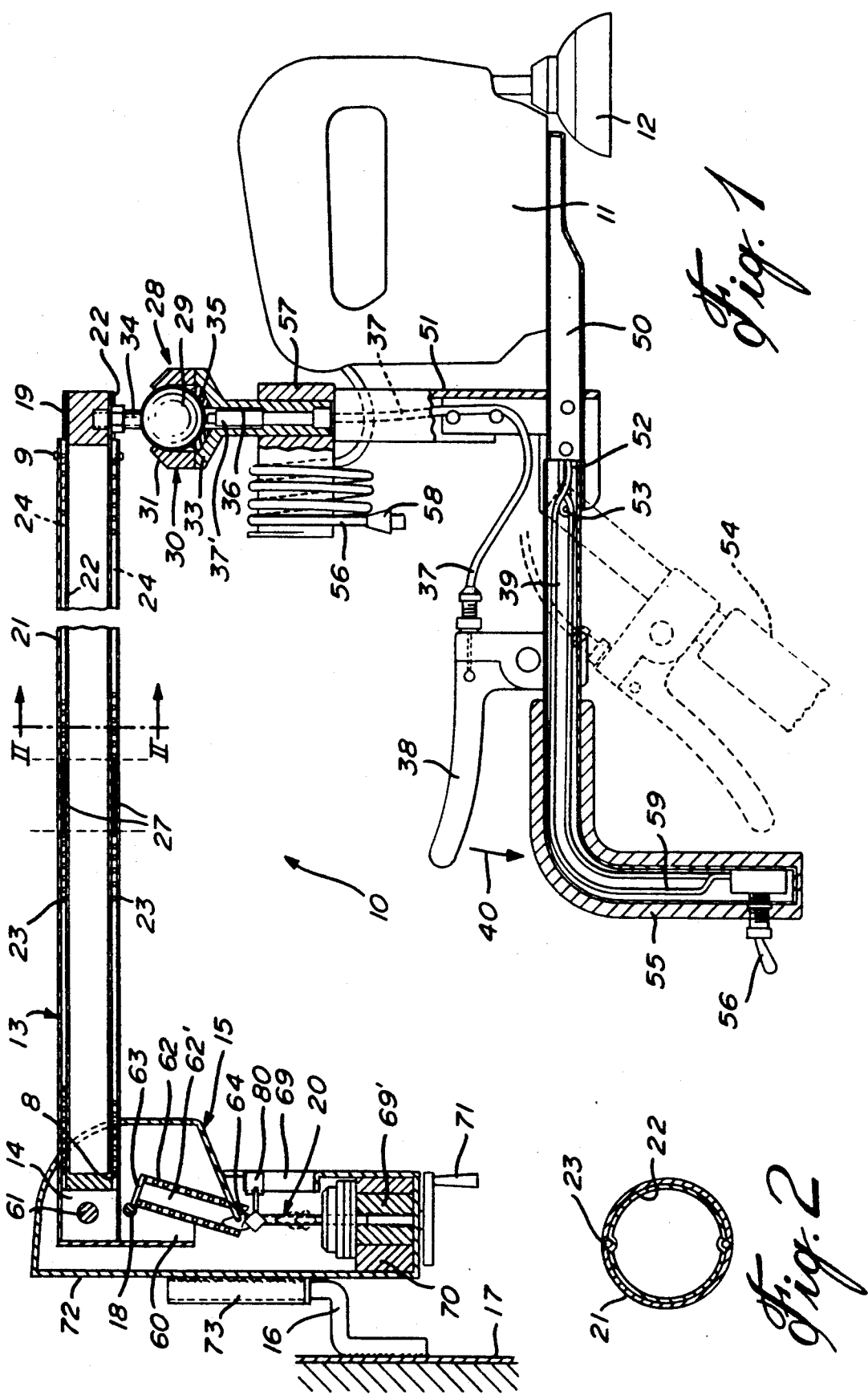

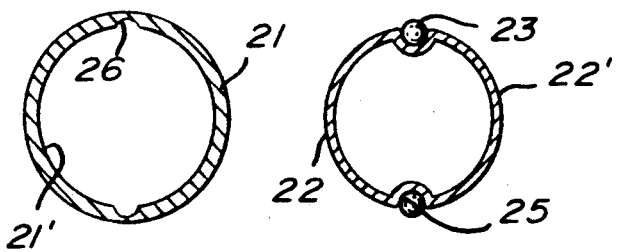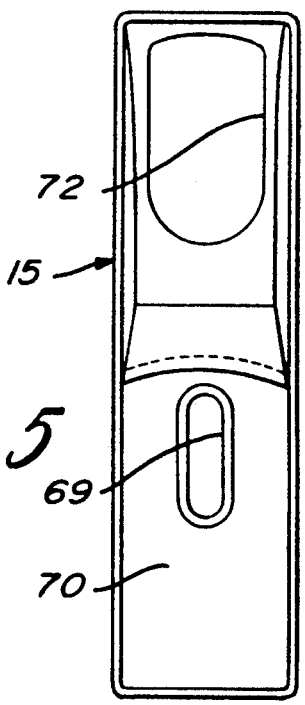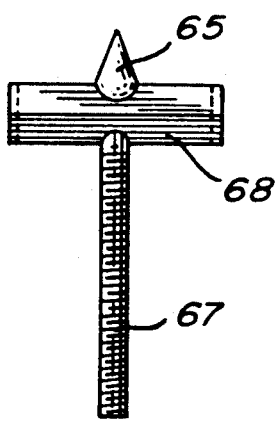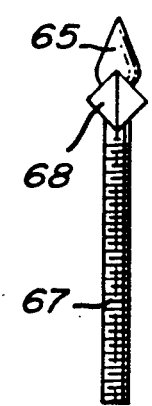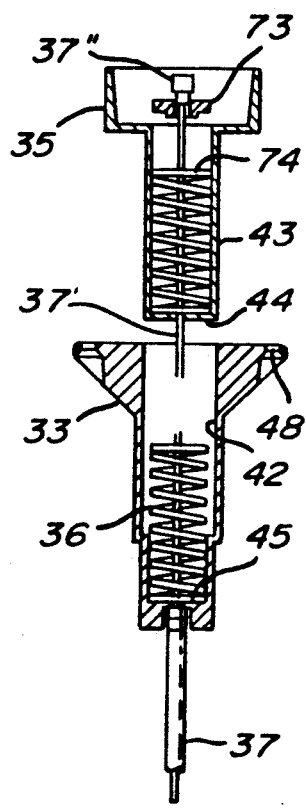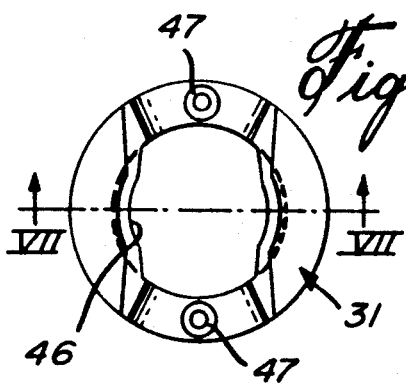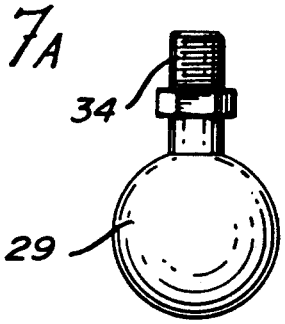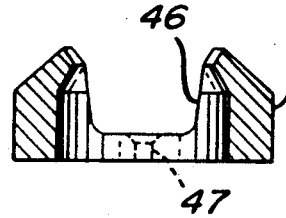

SUPPORT MECHANISM FOR TREATMENT DEVICE

BACKGROUND OF INVENTION

1. Field of Invention

The present invention relates to an improved adjustable support mechanism for supporting a percussion treatment device so that a person can give himself a treatment as is necessary, for example, in the treatment of respitory disease to cause the lungs to secrete.

2. Description of Prior Art

In Canadian Application Serial No. 2,014,929 filed Apr. 19, 1990 there is disclosed the construction of a clapping and vibrating device for expelling retained obstructive secretion in the lungs. That application also discloses a support arm for such apparatus. The present invention is an improvement of that support arm, and the support mechanism of the present application was developed as a replacement of that arm, as it was found inadequate for use by the patient in the self-administering of the treatment by the device supported thereby.

SUMMARY OF INVENTION

It is a feature of the present invention to provide an adjustable support mechanism for treatment device which permits the user patient to control the positioning of the treatment device and its operation through a single control arm or handle.

Another feature of the present invention is that the adjustable support mechanism can be secured to an article of furniture or wall, or other stationary objects, and when secured to the wall the support mechanism can be easily disconnected.

Another feature of the present invention is that the adjustable support mechanism is provided with a pressure biasing means which acts on the load of the treatment device to vary the axial load force thereof.

Another feature of the present invention is to provide an adjustable support mechanism wherein the operation thereof is fully controlled by a single hand of the patient and wherein the patient can apply an axial load to the device.

According to the above features, from a broad aspect, the present invention provides an adjustable support mechanism for supporting a treatment device, and namely, a percussion generating tool having a treatment head which is utilized by a patient to apply vibrations and percussions to a predetermined area of his body. The support mechanism comprises an extendable boom which is pivotally secured at an attachment end to an adjustable pivoting housing which is securable to a stationary object. The pivoting housing permits vertical and horizontal angular displacement of the boom, and has adjustable pressure biasing means acting on the boom to displace same vertically on a pivot connection to thereby apply a vertical moment on the load or the treatment device secured to a free end of the boom. An articulated connecting joint interconnects the treatment device to the free end of the boom. The connecting joint has disconnectible brake means to position the treatment device at a desired angle relative to the free end of the boom. A hand-operable means is provided to position the treatment head to the desired position. A lever is provided to disconnect and reconnect the brake means to adjust the angular position of the treatment device relative to the boom free end.

BRIEF DESCRIPTION OF DRAWINGS

A preferred embodiment of the present invention will now be described with reference to the accompanying drawings in which:

FIG. 1 is a side view, partly fragmented and sectioned, illustrating the adjustable support mechanism of the present invention for supporting a percussion tool having a treatment head;

FIG. 2 is a cross-section view of the boom along cross-section lines II—II of FIG. 1;

FIG. 3 is a cross-section view of the outer tubular member of the boom;

FIG. 4 is cross-section view of the inner tubular member of the boom showing the ball bearings;

FIG. 5 is a front view of the pivoting housing;

FIGS. 6A and 6B are front and side views respectively of a threaded spring support bolt of the pressure biasing means located in the pivoting housing;

FIG. 7A is a top view of the top section of the articulated joint housing;

FIG. 7B is a section view of the housing section of FIG. 7A along section lines VII;

FIG. 8 is a side view of the socket ball as utilized in the articulated joint; and FIG. 9 is an exploded view of the brake clamp and the lower section of the articulated joint housing in which the brake clamp is supported.

DESCRIPTION OF PREFERRED EMBODIMENTS

Referring now to the drawings, and more particularly to FIG. 1, there is shown generally at 10 the adjustable support mechanism of the present invention which is utilized to support a treatment device such as the percussion generating tool 11 to which is attached a clapping head 12. These devices are utilized by patients who have respiratory diseases, such as cystic fibrosis, chronic bronchitis, brochiectasis and other chronic pulmonary diseases, wherein it is necessary for the patient to undergo mechanical physiotherapy or postural drainage on a regular basis. This therapy usually consists of a clapping and vibration motion imparted to specific areas of the patient's back so that the lungs can secrete fluids. With the adjustable support mechanism of the present invention the patient can, by the use of a single hand, manipulate the percussion tool 11 so as to give himself a treatment on a regular basis.

The adjustable support mechanism 10 of the present invention is comprised of an extendible boom 13 which is pivotally secured at an attachment end 14 to an adjustable pivoting housing 15 which is securable to a stationary object, herein a pivot pin 16 secured to a wall 17, or to a desk or other article of furniture (not shown). For the latter attachment there would be provided a support bracket which could be clamped to the article of furniture. The pivoting housing 15 permits vertical and horizontal angular displacement of the boom, and is provided with a pressure biasing means which acts on the boom to displace it vertically on its pivot connection 18 to thereby apply a vertical moment on the load, herein the percussion tool 11, which is connected to the free end 19 of the boom. This pressure biasing means is identified by reference numeral 20, and will be described later in detail.

As herein shown, and with further reference to FIGS. 2 to 4, the boom is a telescopic boom comprised of two tubular members, and namely, an outer tubular member 21 and an inner tubular member 22. The inner tubular member 22 is disposed in concentric sliding relationship within the outer tubular member and spaced and guided with respect to one another by two diametrically opposed longitudinal rows of bearings 23. As better illustrated in FIGS. 2 to 4, the bearings 23 are retained captive in opposed tunnels 24 defined by opposed aligned channel sections 25 and 26 formed respectively in the outer wall 22' of the inner tube 22 and the inner wall 21' of tubular member 21 on diametrically opposed sides. These channels are of concave cross-section and formed axially along the length of these tubular members. The balls are dimensioned to maintain a gap between the outer and inner walls of the concentrically disposed tubular members, and are maintained distributed along the tunnels 24 and by an elongated coil spring 27 positioned substantially at midlength of the tunnels. Accordingly, the ball bearings 23 do not congregate towards one end of the tunnels. A stop pin 9 and a flange section 8 retain the balls captive and limit the extended displacement of the inner tube 22.

At the free end 19 of the inner tubular member 22, there is secured an articulated connecting joint 28 which consists essentially of a stationary metal ball 29 retained captive in an articulated joint housing 30. Referring additionally to FIGS. 7 to 9, the joint housing consists of a top housing section 31 and a botttom section 33 interconnected together and permitting displacement about the ball 29. The ball 29 is connected to the free end of the boom by a bolt extension 34.

As shown in FIG. 9, the bottom section 33 of the housing 30 guidingly supports therein a friction brake clamp member 35. The clamp member 35 is provided with a guide cylinder portion 43 which extends in a guide channel 42 of the bottom section 33. A coil spring 36 is disposed in the guide channel 42 and biases the clamp member outwardly against the ball 29 whereby the outer circumferencial edge 35' of the brake clamp is in clamping contact about the ball whereby to retain the percussion tool 11 at a desired position. In order to release the clamping pressure between the clamp 35 and the ball 29, a retracting cable 37 is secured to a lever 38 mounted on a handle bar 39. The cable 37 has an outer covering which is fixed at the bottom end of the housing bottom section 35 and has an inner cable or wire 37' which extends into the bottom housing section and into the cylinder portion 43 of the brake clamp member 35. The free end of the cable 37' is provided with a head member 37" to abut against a disc 73 located at the top end of a compression coil spring 74. Accordingly, when the lever 38 is actuated in the direction of arrow 40, as shown in FIG. 1, this applies a pulling force on the cable 37' to compress the coil spring 74 in the cylinder portion 43 of the clamp member 35 thereby creating a force which is opposed to the force of the coil spring 36. This force is proportional to the displacement of the lever 38 to facilitate the user in slowly releasing the friction force between the head of the brake clamp 35 or the circumferential portion 35' of the clamp and the ball 29. As herein shown, the bottom end 44 of the cylinder portion 43 has a hole therein through which the cable 37' extends and this bottom wall portion 44 abuts on top of the compression coil spring 36 which is retained captive between the bottom wall 44 of the cylinder portion 43 and the bottom 45 of the guide channel 42.

The top housing section 31, as shown in FIG. 7A, has a top opening 46 which permits the articulation of the housing about the bolt 34 of the socket ball 29. The holes 47 in the top housing section 31 are aligned with the holes 48 in the bottom housing section 33 to accommodate fasteners to interconnect the top and bottom housing sections together about the socket ball 29.

Referring again to FIG. 1, it can be seen that the percussion tool 11 is secured to a tubular support bracket 50. The bottom section 33 of the articulated joint housing is connected to the support bracket 50 by a further tubular frame member 51 which is attached to the extension tubular portion 41 of the bottom housing section 33 and to the tubular bracket 50. The retracting cable 37 extends through this tubular membern 51. At an extension free end 52 of the tubular bracket 50 an end of the handlebar 39 is pivotally connected by a locking pivot pin 53. The locking pivot pin 53 permits the handle to be locked at two distinct positions, one with the handlebar axially aligned with the tubular support bracket 50 and the other as shown in phantom lines 54 with the handlebar extending at 45° to the tubular support bracket. These positions are maintained locked by a retractable lock pin (not shown), but the operation of which is obvious to a person skilled in the art. The handlebar 39 also has a right angle handle section 55. Accordingly the user can grasp the handlebar 39 whereat the lever 38 can be actuated to disconnect the articulated joint 28 to manipulate the angular position of the clamping head 12, and the other transverse handle portion 55 wherein a switch 56 is provided to connect or disconnect electrical power to the percussion tool 11 to cause it to operate or stop. The percussion tool 11, as herein shown, is a jigsaw tool, and its electrical cable 56 is wound about a support bracket 57 which is provided with an electrical connector 58 to receive the plug 58 of the electrical cable 56. The switch cable 59 connects to this electrical plug 58 through the tubular handlebar and tubular section 51.

Referring now to FIGS. 1, 5, 6A and 6B, there will be described the construction and operation of the pressure biasing means 20 As shown in FIG. 1, the attachment end 14 of the telescopic boom 13 is secured to a U-shaped bracket 60 by means of a lock pin or bolt 61. The pivot connection 18 is constituted by a pivot pin secured to the housing 15. A coil spring 62 is also secured at one end to the bracket 60 and to one side and below the pivot connection 18 at connecting point 63. The spring 62 is positioned about a guide pin 62' in a top portion thereof. The lower end 64 of the coil spring 62 is retained captive about the head 65 of a compressing member, herein a threaded bolt member 67 as shown in FIGS. 6A and 6B. The threaded bolt has guide shoulders 68 with an angulated top wall on which the spring lower end rests. An indicator member 80 is secured to the bolt member 67 and extends in slot 69 in the front wall 70 of the housing 15, as shown in FIG. 5 to indicate the degree of compression on the spring 62. The threaded bolt 67 is received within a threaded cylinder 69' which is retained by a bracket 70 in the lower portion of the housing 15, and which is axially rotated by a crank 71 so that the threaded bolt 67 may be displaced axially to apply a compression force against the coil spring 62, or to reduce the compression force. This compression force applies a vertical moment or a vertical pressure on the telescopic arm free end to offset the load of the percussion tool 11 mounted on the tubular bracket as well as the entire load of the handle and brackets, etc. secured to the articulated connecting joint 28. Accordingly, it is possible for the user to vary the axial load of the percussion tool by rotating the crank 71.

As shown in FIG. 5, the housing 15 is provided with an arcuate slot 72 in a top part thereof for the vertical arcuate displacement of the telescopic boom 13. The boom and housing 15 are also arcuately displaced along a horizontal plane by means of its connection on the pivot pin 16. As shown in FIG. 1, the rear wall 72 of the housing 15 is provided with a sleeve 73 welded thereto, and this sleeve permits the housing to rotate about the pin 16 to provide this horizontal displacement. It also provides for a quick connection and disconnection. Therefore, it can be seen that the housing permits the boom to be displaced arcuately both in the vertical and horizontal planes, and the percussion tool can be displaced to a multitude of angles by its articulated connecting joint 28. Because the handle 55 is hinged to the tubular bracket 50, this provides for the user to locate the clamping head 12 in substantially any portion of his body for treatment. As previously described, with the treatment of cystic fibrosis the treatment must be given about the user's rib cage both front and back, and this can be done with the adjustable support mechanism of the present invention with the user sitting, standing, or lying down at any angle.

It is within the ambit of the present invention to cover any obvious modifications of the preferred embodiment described herein, provided such modifications fall within the scope of the appended claims.

We claim:

1. An adjustable support mechanism for supporting a treatment device having a treatment head for locating said head at a desired position of a person's body, said support mechanism comprising an extendable boom pivotally secured at an attachment end to an adjustable pivoting housing securable to a stationary object, said pivoting housing permitting vertical and horizontal angular displacement of said boom and having adjustable pressure biasing means acting on said boom to displace same vertically on a pivot connection to thereby apply a vertical moment on said treatment device, an articulated connecting joint having a connecting arm secured to a support bracket to which said treatment device is removably secured, said connecting joint interconnecting said treatment device to a free end of said boom said connecting joint having a disconnectible brake means to position said treatment device at a desired angle relative to said free end of said boom, a handle connected to said support bracket to position said treatment head to said desired position, and means to disconnect and reconnect said brake means to adjust the angular position of said treatment device relative to said boom free end, said means to disconnect and reconnect said brake means is a pivoting lever secured to said handle said pivoting lever applies a pulling force on a spring biased brake clamp, said brake clamp being held in a lower section of a two-section ball joint housing, said connecting arm being connected to said lower section of said two-section ball joint housing so that said connecting arm and support bracket and device may be connected at a desired angle relative to said boom free end.

2. A support mechanism as claimed in claim 1 wherein said adjustable pressure biasing means is a compressible spring biasing member, said spring biasing member being secured at a forward end to said attachment end of said boom offset from a pivot axis of said boom attachment end, a rear end of said compressible spring being secured to an adjustable compressing member having an actuable member to vary the compression of said compressible spring biasing member.

3. A support mechanism as claimed in claim 2 wherein said actuable member is a crank secured to a threaded member constituting said compressing member.

4. A support mechanism as claimed in claim 3 wherein said threaded member is an axially extendable threaded push rod having a spring engaging head engaged with said rear end of said compressible spring, said spring being a coil spring guided by guide means secured to a pivoting bracket attahed to said attachment end of said boom.

5. A support mechanism as claimed in claim 1 wherein said pivoting housing is provided with a sleeve in a rear wall thereof, said sleeve being positionable over a stationary pin to pivotally secure said housing to said pin for horizontal arcuate displacement of said housing and said boom connected thereto.

6. A support mechanism as claimed in claim 1 wherein said boom is a telescopic boom comprised of two tubular members, an inner one of said tubular members being disposed in concentric sliding relationship within an outer one of said tubular members, and anti-friction bearing means between said two tubular members.

7. A support mechanism as claimed in claim 6 wherein said anti-friction means comprises two diametrically opposed longitudinal rows of bearing balls retained captive in a tunnel defined by opposed channel sections formed axially in an outer wall of said inner tubular member and an inner wall of said outer tubular member, and means to maintain said balls dispersed in at least two sections of said tunnel, said balls being dimensioned to maintain a gap between said outer and inner walls and to prevent axial rotation of said inner and outer tubular members.

8. A support mechanism as claimed in claim 7 wherein said means to maintain said balls dispersed is an elongated coil spring disposed in said tunnel separating said balls in two opposed groups along said tunnel.

9. A support mechanism as claimed in claim 1 wherein said treatment device is a percussion tool having a clapping head for the treatment of respiratory diseases by applying a clapping and vibratory motion to the lung area of a patient's back.

10. A support mechanism as claimed in claim 1 wherein said handle is an angulated handle member which is pivotally connected and lockable with said support bracket, said handle permitting a user to apply an axial force on said percussion tool.

11. A support mechanism as claimed in claim 10 wherein said handle is provided with electrical switch means to activate the operation of said treatment device, said device being a percussion tool.

12. A support mechanism as claimed in claim 1 wherein said two-section ball housing is interconnected and displaceable over a stationary socket ball secured by a connecting shaft to said boom free end.

13. A support mechanism as claimed in claim 1 wherein said treatment device is a percussion tool having a clapping head for the treatment of respiratory diseases by applying a clapping motion to the lung area of a patient's back.

* * * * *